(12) United States Patent
Irmscher et al.

(10) Patent No.: US 8,089,357 B2
(45) Date of Patent: Jan. 3, 2012

(54) SYSTEM AND METHOD FOR SECURING AND DISPLAYING ITEMS FOR MERCHANDISING

(75) Inventors: Julia Irmscher, Zwingenberg (DE); Michael Rapp, Modautal (DE)

(73) Assignee: Checkpoint Systems, Inc., Philadelphia, PA (US)

( * ) Notice: Subject to any disclaimer, the term of this patent is extended or adjusted under 35 U.S.C. 154(b) by 0 days.

(21) Appl. No.: 12/752,494

(22) Filed: Apr. 1, 2010

(65) Prior Publication Data

US 2010/0191651 A1  Jul. 29, 2010

Related U.S. Application Data

(63) Continuation of application No. 11/693,352, filed on Mar. 29, 2007, now Pat. No. 7,701,339.

(60) Provisional application No. 60/787,864, filed on Mar. 31, 2006.

(51) Int. Cl.
*G08B 13/14* (2006.01)

(52) U.S. Cl. ......... 340/568.1; 705/50; 705/26; 705/346; 345/173; 715/780

(58) Field of Classification Search ............... 340/568.1
See application file for complete search history.

(56) References Cited

U.S. PATENT DOCUMENTS

| | | | |
|---|---|---|---|
| 3,885,773 A | 5/1975 | Dunkelberger | |
| 5,377,737 A | 1/1995 | Moriya et al. | |
| 5,552,771 A | 9/1996 | Leyden et al. | |
| 5,884,403 A | 3/1999 | Rogers | |
| 6,039,496 A | 3/2000 | Bishop | |
| 6,310,550 B1 | 10/2001 | Wagener | |
| RE37,590 E | 3/2002 | Leyden et al. | |
| 6,380,855 B1 * | 4/2002 | Ott | 340/568.2 |
| 6,400,265 B1 | 6/2002 | Saylor et al. | |
| 6,578,683 B1 | 6/2003 | Burke et al. | |
| 6,659,382 B2 | 12/2003 | Ryczek | |
| 6,690,277 B1 | 2/2004 | Hansen et al. | |
| 6,700,488 B1 | 3/2004 | Leyden et al. | |
| 6,799,994 B2 | 10/2004 | Burke | |
| 6,828,909 B2 | 12/2004 | Script et al. | |
| 6,879,961 B1 | 4/2005 | Pathirana | |
| 6,896,543 B2 | 5/2005 | Fort et al. | |
| 6,946,961 B2 | 9/2005 | Frederiksen et al. | |
| 7,002,467 B2 | 2/2006 | Deconinck et al. | |
| 7,021,091 B2 | 4/2006 | Leyden et al. | |
| 7,053,774 B2 | 5/2006 | Sedon et al. | |

(Continued)

FOREIGN PATENT DOCUMENTS

CA  2096603  11/1994

(Continued)

*Primary Examiner* — Travis Hunnings
(74) *Attorney, Agent, or Firm* — Sand & Sebolt

(57) ABSTRACT

A system and method for automatically advertising items put on display, as well as protecting those items against theft. The system and method include an event sensor associated with the item and connected to a monitoring and alarm transmitter for initiating an advertising experience on an associated and local graphic display whenever the item is manipulated or approached by a patron. Should the item be removed or taken from its display stand, a wireless alarm is automatically transmitted to a receiver of an authorized person. The system and method also perform a logging function when a patron approaches the item or removes it without taking it away. The system and method also include the ability to provide power to electronic items that are on display.

17 Claims, 6 Drawing Sheets

U.S. PATENT DOCUMENTS

| | | |
|---|---|---|
| 7,081,822 B2 | 7/2006 | Leyden et al. |
| 7,111,181 B2 | 9/2006 | Bell |
| 7,132,952 B2 | 11/2006 | Leyden et al. |
| 7,135,972 B2 | 11/2006 | Bonato |
| 7,154,039 B1 | 12/2006 | Marszalek et al. |
| 7,202,417 B2 | 4/2007 | Marszalek et al. |
| 7,202,786 B2 | 4/2007 | Marszalek et al. |
| 7,204,107 B2 | 4/2007 | Leyden et al. |
| 7,209,038 B1 | 4/2007 | Deconinck et al. |
| 7,327,276 B1 | 2/2008 | Deconinck et al. |
| 7,375,638 B2 | 5/2008 | Light et al. |
| 7,397,372 B2 * | 7/2008 | Perri et al. ................ 340/562 |
| 7,626,500 B2 | 12/2009 | Belden, Jr. et al. |
| 7,817,051 B2 | 10/2010 | Cheng et al. |
| 2001/0054952 A1 | 12/2001 | Desai et al. |
| 2002/0068991 A1 | 6/2002 | Fitzsimmons, Jr. |
| 2003/0034890 A1 | 2/2003 | Baumeister et al. |
| 2003/0069964 A1 | 4/2003 | Shteyn et al. |
| 2003/0122671 A1 | 7/2003 | Jespersen |
| 2004/0044580 A1 * | 3/2004 | Haller ......................... 705/17 |
| 2005/0073413 A1 | 4/2005 | Sedon et al. |
| 2005/0134458 A1 | 6/2005 | Leyden et al. |
| 2005/0150952 A1 * | 7/2005 | Chung ......................... 235/385 |
| 2005/0198396 A1 | 9/2005 | Horne et al. |
| 2005/0263315 A1 | 12/2005 | Marszalek et al. |
| 2006/0097875 A1 | 5/2006 | Reinhold |
| 2007/0152819 A1 | 7/2007 | Marszalek et al. |
| 2007/0194918 A1 | 8/2007 | Rabinowitz et al. |

FOREIGN PATENT DOCUMENTS

| | | |
|---|---|---|
| DE | 19528178 | 2/1997 |
| DE | 19726413 | 1/1999 |
| DE | 10250004 | 5/2004 |
| DE | 10250339 A1 | 5/2004 |
| DE | 202005015472 | 1/2006 |
| DE | 202005016181 | 2/2006 |
| DE | 102004053426 | 5/2006 |
| EP | 1030284 | 8/2000 |
| EP | 1417912 | 5/2004 |
| GB | 2440600 | 2/2008 |
| JP | 2001243564 | 9/2001 |
| JP | 2005309521 | 11/2005 |
| WO | 02/090693 | 11/2002 |
| WO | 03/032240 | 4/2003 |

* cited by examiner

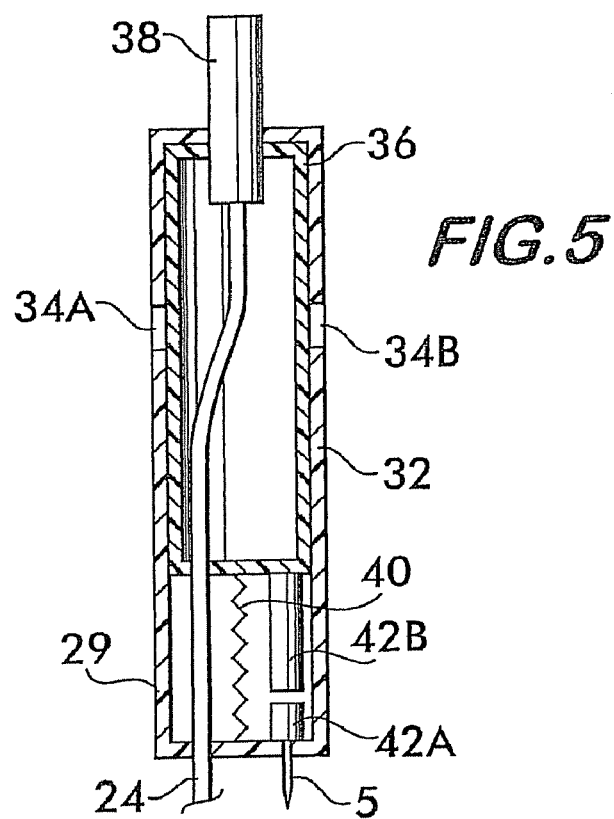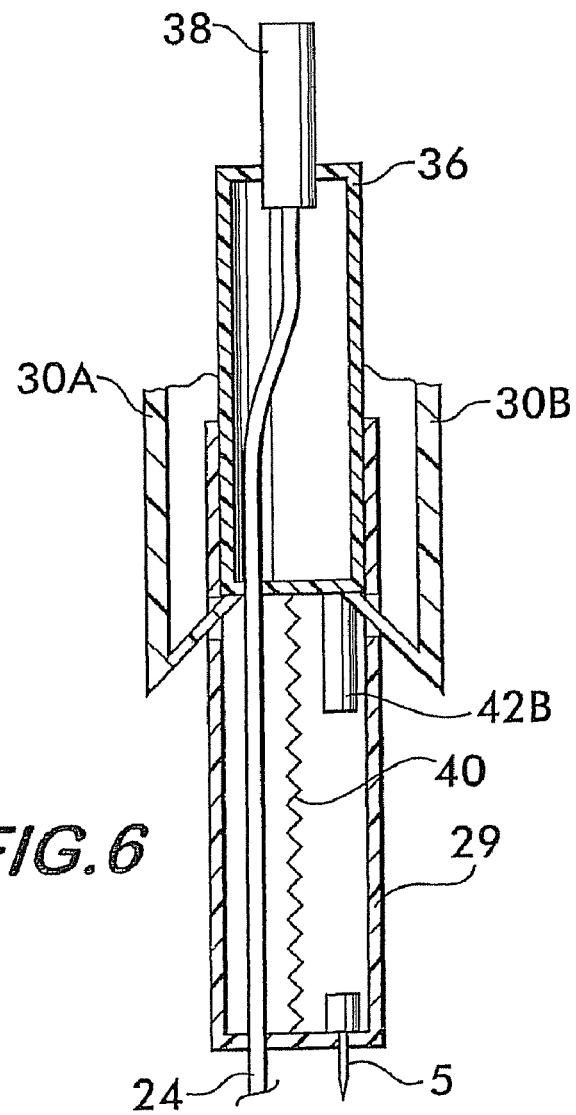

SYSTEM AND METHOD FOR SECURING AND DISPLAYING ITEMS FOR MERCHANDISING

CROSS REFERENCE TO RELATED APPLICATIONS

This application is a continuation of U.S. patent application Ser. No. 11/693,352 filed Mar. 29, 2007; which application claims priority from U.S. Provisional Application Ser. No. 60/787,864, filed Mar. 31, 2006; the disclosures of which are incorporated herein by reference.

BACKGROUND OF THE INVENTION

1. Field of Invention

The current invention relates generally to displaying of items for merchandising purposes and more specifically to a system and method for displaying items on a counter or some other structure in a commercial environment and providing a graphic display of information relating to the items at the counter or other structure so that persons approaching or touching such items can receive information relevant to the item, while protecting the item from theft.

2. Description of Related Art

The surveillance of freely presented objects to protect them against theft by means of a sensor that is connected to a monitoring and alarm device via an electrical line is known in the art. Such items are commonly displayed on a counter or other structure for viewing by prospective purchasers. When the line or the anti-theft installation is manipulated or the sensor is removed, the monitoring and alarm device sets off an audible and visual alarm. Moreover, sales-promoting systems are known using, for example, endless-loop audiovisual advertising. They suffer however from the disadvantage of not allowing perfectly timed advertising geared to the specific information needs, accordingly resulting in high coverage losses. It has been proposed to provide a method and an apparatus of the type initially referred to, which enables specific, product-related advertising while at the same time providing for reliable surveillance of the displayed object and requiring a comparatively small outlay particularly in equipment and installation, by providing an audible alarm at the counter or a visual alarm at the display device when the item is attempted to be removed. The product information about the item on display is by means of audiovisual devices, since this allows a comprehensive information in a particularly intensive, fast and effective way. The audiovisual product information may be output preferably by means of a product information device including a video data base with a digital player and a connected visual display unit for visual display and, as the case may be, a loudspeaker and/or headset for listening.

Typically, a free presentation includes a plurality of objects. When, as a further action, events are counted and/or date and/or time of the day are saved, the detections may be stored with date and time of the day for later reference in statistical analyses in order to obtain information about the attractiveness of the object put on display. For this purpose, the monitoring and alarm device includes a storage memory for storing the event count and/or date and/or time of the event.

In the absence of a current event being detected, no product-related promotion will be shown, instead general advertising may be shown in the meantime. This may include manufacturer advertising of the displayed object or market advertising. These advertising periods as well as the aforementioned statistical data obtained may be evaluated and/or sold to the manufacturers, for example.

Particularly electronic products in the fields of information technology and audio/video equipment are as a rule freely presented in substantial quantities. When a theft alarm is set off, it is therefore difficult to be able to locate the site of the theft promptly.

Therefore, it may be useful when, in the case of a theft, an audible alarm is set off and an at least visual alarm concerning the object to be secured is produced by the device provided for audiovisual product information.

In the case of a theft alarm it is thus possible to output on the visual display unit associated with the stolen object a product-related alarm notification, thereby enabling the site of the theft to be located promptly. Using the same infrastructure, it is also possible to place the freely presented items under surveillance, allowing a fast, product-related visualization of the alarm on the one hand and promotion of the items on the other hand, which results in significant cost reductions in investment and the obtainment/sale of statistical data. The logging sensor is also capable of tripping further promotional actions including, for example, actions that also address the remaining sense organs, such as scents, wind and the like. The sensor of the logging device may be a motion sensor. It operates to start the product information when a prospective buyer approaches or stands in front of the item on display. No additional action is required in this case. However, the possibility also exists for the sensor of the logging device to be a removal sensor. In this event the product information is not started until the prospective buyer takes the item in his/her hand, showing an apparent interest in it. False activations as may be caused by a passing customer are thereby avoided. In either event, the product information is activated when the prospective buyer is within a predetermined range in the region of the displayed item.

The sensor of the logging device may be a switch, in particular a mechanical or capacitive or inductive or optoelectronic or magnetic switch. Particularly advantageously, the sensor of the logging device is part of the anti-theft sensor arrangement, because this enables multiple use to be made of existing equipment. Moreover, the anti-theft sensor arrangement preferably includes a sensor affixed to the item to be secured, which sensor is connected to the monitoring and alarm device through a cable wound on a cable retractor, with the sensor of the logging device being configured to detect when the wound-up cable is being pulled off the cable retractor. The cable retractor provides for a "neat" presentation. The sensor may be configured as a magnetic switch comprising a reed contact mounted on the enclosure of the cable retractor and a magnet fitted to the pull-out type cable. In this arrangement it is suitable for the magnet fitted to the cable to be constructed as a cable stop resting against an abutment with the cable in roughly wound-up condition. Such a sensor arrangement affords, among other things, the advantage of being able to be retrofitted with ease.

While the aforementioned apparatus and method are primarily concerned with the securing of items of merchandise, they may also find utility in exhibitions, galleries, for example, to provide the viewer with explanations/information, and, on the other hand, in the securing of the exhibits, such as paintings, against theft. The theft detection sensor may be affixed preferably to the frame or the like, while the logging sensor is preferably a motion sensor that, on recording a viewer's presence, starts the output of information.

As should be appreciated by those skilled in the art, that while the foregoing proposed method and apparatus appears generally suitable for its purposes, it still leaves something to be desired from the standpoint of effective advertising and promotion of the items. In this regard, while the provision of an audible alarm at the counter (or even a visual alarm on the display device on or adjacent the counter), may have the effect of deterring or preventing theft, it creates a negative atmosphere, e.g., other potential customers in the vicinity of the display may be frightened or otherwise put off by a sounding alarm indicating a theft has occurred. Thus, a need exists for a system and method which provides the advantages of enabling persons to readily examine an item, to receive information relevant to that item when they pick up or touch the item, while providing against theft by producing a wireless signal to authorized personnel located remotely from the display.

All references cited herein are incorporated herein by reference in their entireties.

BRIEF SUMMARY OF THE INVENTION

In accordance with one aspect of the invention there is provided a system for displaying an item and providing promotional material about the item on a graphic display in a commercial environment. The item is located on a counter or other structure in the commercial environment to enable persons to approach and examine the item at that counter or other structure.

The system basically comprises an event sensor associated with the item, a monitoring and alarm apparatus and a product information device (e.g., a graphic display). The event sensor (e.g., a retractable tether or cable with cooperating sensors, or non-contact sensors such as proximity sensors, motion detection sensors, etc.) detects the manipulation of, or approach of a user to, the item, and wherein the event sensor is coupled to the monitoring and alarm apparatus. The event sensor emits a sensor signal to the monitoring and alarm apparatus corresponding to the manipulation of, or approach of a user to, the item; and the product information device (e.g., a graphic display) is arranged to receive an activation signal from the monitoring and alarm apparatus when a user approaches or touches the item at the counter or other structure, whereupon the product information device provides visual information (and also may include audible information) relating to the item; the monitoring and alarm apparatus a transmitter which is arranged to automatically provide a wireless signal in the event that a person removes the item from the vicinity of the counter or other structure. The system also includes a receiver (e.g., a cellular telephones, etc.) located remotely of the counter or other structure. The receiver is arranged to receive the wireless signal to alert an authorized person of the removal of the item from the vicinity of the counter or other structure.

In accordance with a further aspect of this invention, the system also includes the added feature that if the item is an electronic item (e.g., cellular telephones, cameras, portable DVD/CD players, memory sticks, camcorders, etc.), the system also provides power to the electronic item while detecting the manipulation or removal of the electronic item.

In accordance with another aspect of this invention there is provided a method for displaying an item and providing promotional material about the item on a graphic display in a commercial environment while deterring theft. The method includes displaying the item on a counter or other structure in the commercial environment to enable persons to approach and examine the item thereat; detecting the manipulation of, or the approach of a user to, the item; and generating a graphic display including visual or audible information relating to the item in automatic response to a user approaching or touching the item at the counter or other structure. This method includes automatically transmitting a wireless signal to a remote receiver (e.g., cellular telephones, etc.) in the event that a person removes the item from the vicinity of the counter or other structure, the receiver being arranged when it receives the wireless signal to alert an authorized person of the removal of the item from the vicinity of the counter or other structure.

In accordance with a further aspect of this invention, where the item is an electronic item (e.g., cellular telephones, cameras, portable DVD/CD players, memory sticks, camcorders, etc.), the method also includes providing power to the electronic item while detecting the manipulation or removal of the electronic item.

In accordance with even a further aspect of this invention, there is provided a system for displaying an item and providing promotional material about the item on a graphic display in a commercial environment, the item being located on a counter or other structure in the commercial environment to enable persons to approach and examine the item thereat. The system comprises: an event sensor coupled to an electronic item (e.g., cellular telephones, cameras, portable DVD/CD players, memory sticks, camcorders, etc.) via a tether for physically securing an electronic item to the counter or other structure in the commercial environment to deter unauthorized removal of the item from the counter or other structure. The event sensor detects the manipulation of, or approach of a user to, the electronic item, whereby the event sensor also is coupled to a monitoring and alarm apparatus and wherein the event sensor emits a sensor signal to the monitoring and alarm corresponding to the manipulation of, or approach of a user to, the electronic item. The system also includes a product information device arranged to receive an activation signal from the monitoring and alarm apparatus when a user approaches or touches the item at the counter or other structure, whereupon the product information device provides visual information relating to the item; and wherein the tether comprises a power conductor and a sensor signal conductor, whereby the power conductor and sensor signal conductors have ends that are contained within a power jack that couples to the electronic item for powering or charging the electronic item at the counter or other structure.

In accordance with another aspect of this invention, there is provided a method for displaying an electronic item (e.g., cellular telephones, cameras, portable DVD/CD players, memory sticks, camcorders, etc.) and providing promotional material about the electronic item on a graphic display in a commercial environment. The method comprises: displaying the electronic item on a counter or other structure in the commercial environment to enable persons to approach and examine the electronic item thereat; powering or charging the electronic item at the counter or other structure; detecting the manipulation of, or the approach of a user to, the item; and generating a graphic display including visual or audible information relating to the item in automatic response to a user approaching or touching the electronic item at the counter or other structure.

BRIEF DESCRIPTION OF SEVERAL VIEWS OF THE DRAWINGS

The invention will be described in conjunction with the following drawings in which like reference numerals designate like elements and wherein:

FIG. 5 is a cross-sectional view of an exemplary power jack for use in the embodiment of FIG. 4 and shown in the unconnected condition; and FIG. 6 is a cross-sectional view of the power jack of FIG. 5 shown in the extended condition when connected to the electronic device.

DETAILED DESCRIPTION OF THE INVENTION

Figure 1:
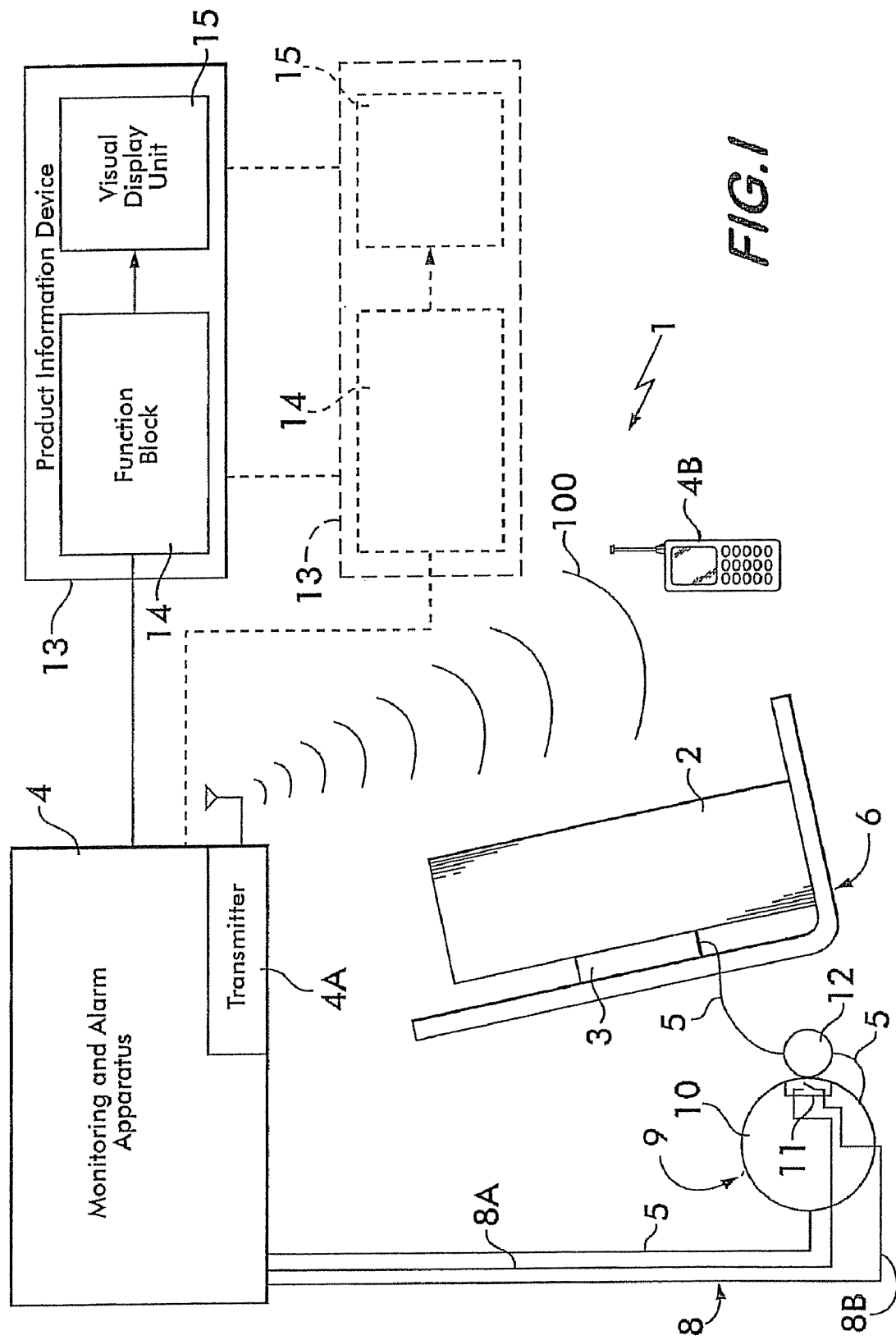
FIG. 1 is a functional diagram of one exemplary system for protection against theft as well as for the automatic output of product information constructed in accordance with this invention and which carries out the method of this invention.
Figure 1A:
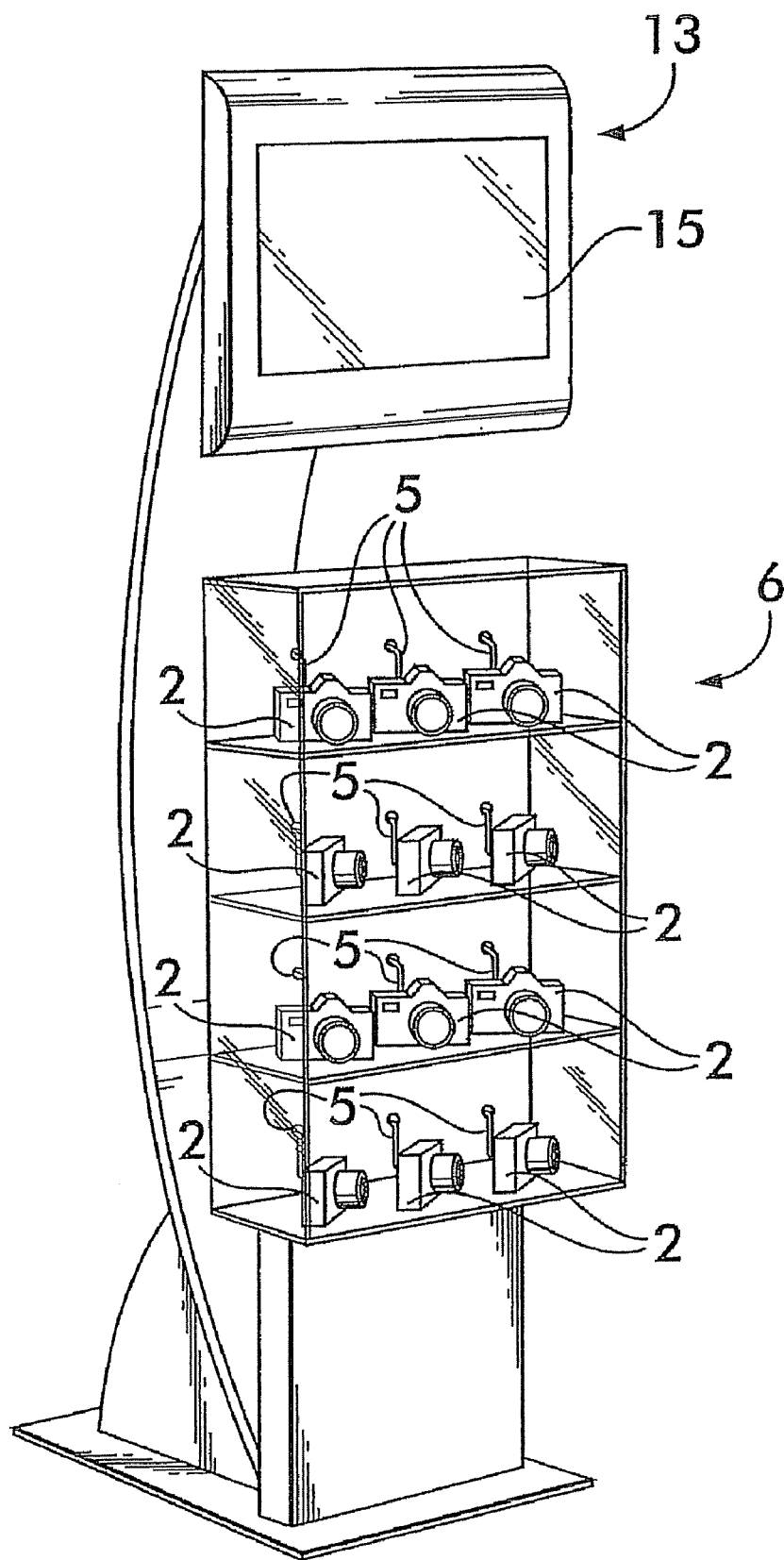
FIG. 1A provides an exemplary product display (e.g., a camera display) using the system and method of the present invention.

Referring now to the various figures of the drawing wherein like reference characters refer to like parts, there is shown in FIG. 1 a system and method for displaying one or several items, or mobile electronic devices, e.g., products, such as cellular telephones, cameras, portable DVD/CD players, memory sticks, camcorders, etc., so that people can approach the counter or other structure where such items are being displayed to examine them and to receive information about the item or having some relevance to the item via an associated graphics display located at or adjacent the counter or other structure at which the item(s) is(are) located. The display may include audible transducers for providing sound with the visual display. FIG. 1A provides an exemplary product display, counter or other display (e.g., a camera display) using the system and method of the present invention. In any case the system is arranged so that an alarm will be set off if the item(s) is attempted to be stolen. The system 1 shown in FIG. 1 thus serves the dual purpose of protecting items of merchandise put on display or objects 2 against theft and performing a logging function when a person approaches the object 2 or removes the object without taking it away. The portion of the system 1 that provides this dual function is known as a "contents management system" (CMS) that combines loss prevention features with advertising. Alternatively, the CMS could be configured to just provide advertising.

Figure 2:
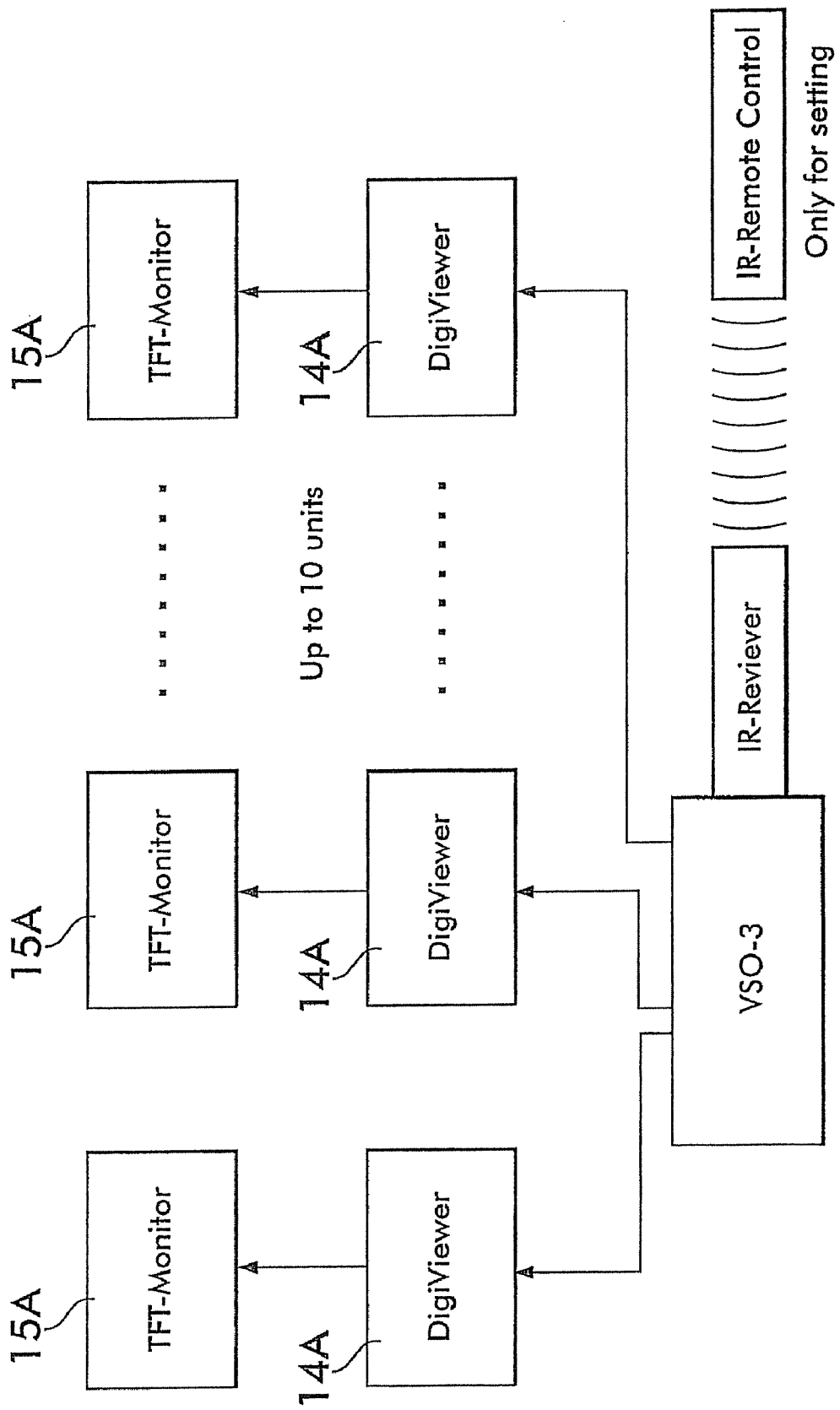
FIG. 2 is a functional diagram of an exemplary content management structure (CMS) for providing advertisement with the displayed product.
Figure 3:
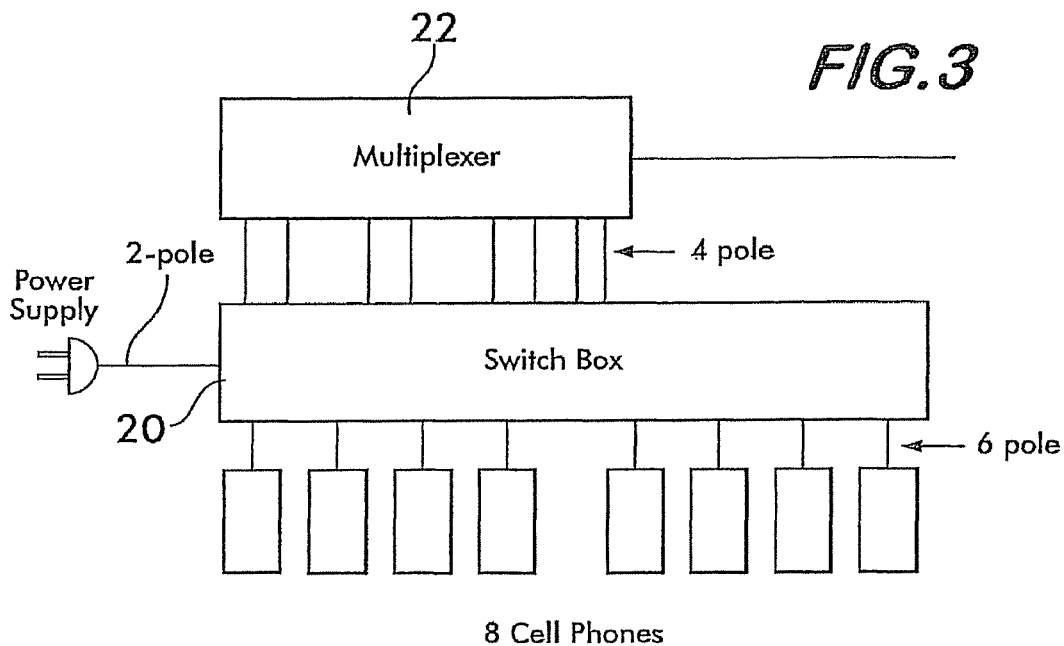
FIG. 3 depicts a powering feature of the system and method of the present invention for powering/charging electronic devices on display while providing theft detection and product advertisement initiation.

When a logging function is performed, at least one action, namely a product information about the object on display, is started. The objects 2, e.g. cell phones, cameras, etc., are freely accessible to the prospective buyer in one or several display shelves 6. Depending on the configuration of the apparatus 1, up to 250 items may be subjected to surveillance and presented by audiovisual devices. When a customer picks up a displayed product, an "event" gets triggered and a short advertisement is played out on monitor 15 (e.g., a TFT-monitor). By way of example only, FIG. 2 depicts a functional; diagram of a CMS advertisement embodiment that uses a plurality of monitors 15A (e.g., a TFT-monitor) and video database and digital player 14A (e.g., DiGiViewer DV-325). Whenever a customer picks up a displayed product, an "event" is triggered and a short advertisement is played out at the TFT monitor 15A via the VSO3 (e.g., a hardware controller) and a DiGiViewer (e.g., a hardware controller). The DiGiViewer stores the advertisements and the VSO3 provides the interface.

The apparatus 1 includes a theft detection sensor 3 that is affixed to the object 2 to be secured and is connected to a monitoring and alarm device 4 by means of a cable 5. When the sensor 3 responds when removed from the object 2 or when the cable 5 is severed or manipulated, a theft alarm is produced. The monitoring and alarm device 4 comprises, among other things, memory for event or occurrence counts (e.g., object manipulation), date and time of occurrence. A further improvement of the alarm device 4 is the provision of a transmitter 4A that provides a wireless signal 100 to a store manager or store employee's PDA (personal digital assistant) or cell phone 4B, or other wireless receiver, or to a secure monitor that alerts the individual that a theft is in progress. The signal also provides identification of the item being stolen and its location in the retail establishment. Thus, instead of setting off a general alarm, a "silent alarm" or "specified alarm" is provided to the proper personnel that can take swift and appropriate action without alarming the other customers in the vicinity.

When a person approaches or removes the object 2 on display, this will be recorded by a logging device, the ensuing action then being an audiovisual product information. In the embodiment shown, the logging device includes an "event" or "removal" sensor 7 which is in controlling communication with the monitoring and alarm device 4 provided as antitheft device via a cable 8, so that both functions require only one shared monitoring and alarm device. Although not shown, the monitors 15 (or 15A) may be associated with I/O devices that the customer can interact with and input particular information that can modify the advertising experience for that customer. By way of example, the I/O device may include a card reader, (e.g., a membership card) that allows the CMS to customize the advertisement being played out to the customer.

The cable 5 connected to the theft detection sensor 3 is wound on a cable retractor 9. The removal sensor 7 is configured to detect when the wound up cable 5 is being unwound from the cable retractor 9. In the embodiment shown the sensor 7 is constructed as a magnetic switch having a reed contact 11 fitted to the cable retractor enclosure 10 as well as a magnet 12 fitted to the pull-out type cable 5. The reed contact is preferably embedded in plastic and may be mounted on or in the cable retractor enclosure 10. A cable 8, formed by reed contact conductors 8A/8B, provide the monitoring and alarm device 4 with the reed contact 11 state. Aside from its function as a permanent magnet 12 for switching the reed contact 11 as soon as the magnet 12 leaves its position of rest when the cable 5 is pulled out, causing the magnetic field at the reed contact 11 to be interrupted, the magnet 12 has the added function of a cable stop for pull-relief of the cable 5 and the connected sensor 3 in the rest position. In this arrangement, the magnet 12 affixed to the cable 5 functions as a cable stop (or cable-restraining detent, whereby if the cable 5 is rolled completely out, the magnet acts as a counter detent), resting in roughly wound-up condition of the cable 5 against an abutment defined by the enclosure 10 in this embodiment. It is particularly advantageous in this arrangement for the sensor 7 (event sensor) to be retrofittable easily, to be a low-cost and sturdy item and to require little space.

Other possible "event" sensors may include optical or photosensors, motion sensors, inductive sensors, or even push button sensors (e.g., for use on large electronic products such as washing machines, etc.; by way of example only, a customer may depress a button on the machine to initiate product information). Furthermore, by way of example only, approximately 256 sensors can be used in one CMS network. To obtain the dual function of the CMS (e.g., loss prevention and advertisement), approximately 128 products can be secured and promoted at once. Sixteen VSL units and 128 sensors are directed to the advertisement function while 16 VSLs and 128 sensors are directed to loss prevention.

For presenting the objects 2 put on display, product information devices 13 are in controlling communication with the monitoring and alarm device 4. The product information device 13 contains a function block 14 with a video data base and a digital player as well as a visual display unit 15. The dashed line indicates that plural, for example, ten, product information devices 13 may be connected to the monitoring and alarm device 4.

Depending on which removal sensor 7 was activated, the associated product information is retrieved from the video data base and shown on the visual display unit 15. A product information device 13 may be assigned to single objects 2 or a plurality, particularly a group, of similar objects on display. How many objects 2 are allocated to a product information device 13 depends, inter alia, on the object size. For example, twenty five exhibits 2 may share one product information device 13 with a video data base and a digital player as well as a visual display unit 15.

The modular design enables the apparatus 1 to be configured individually in conformity with the given conditions. Thus, an existing apparatus for theft detection is readily extendable and with relatively little effort to include one or plural product information devices 13 and one or plural removal sensors 7, providing a system enabling the output of specific product information. On the other hand, the product information device 13 or several such devices may also be used as standalone with one or several removal sensors 7.

Figure 1B:
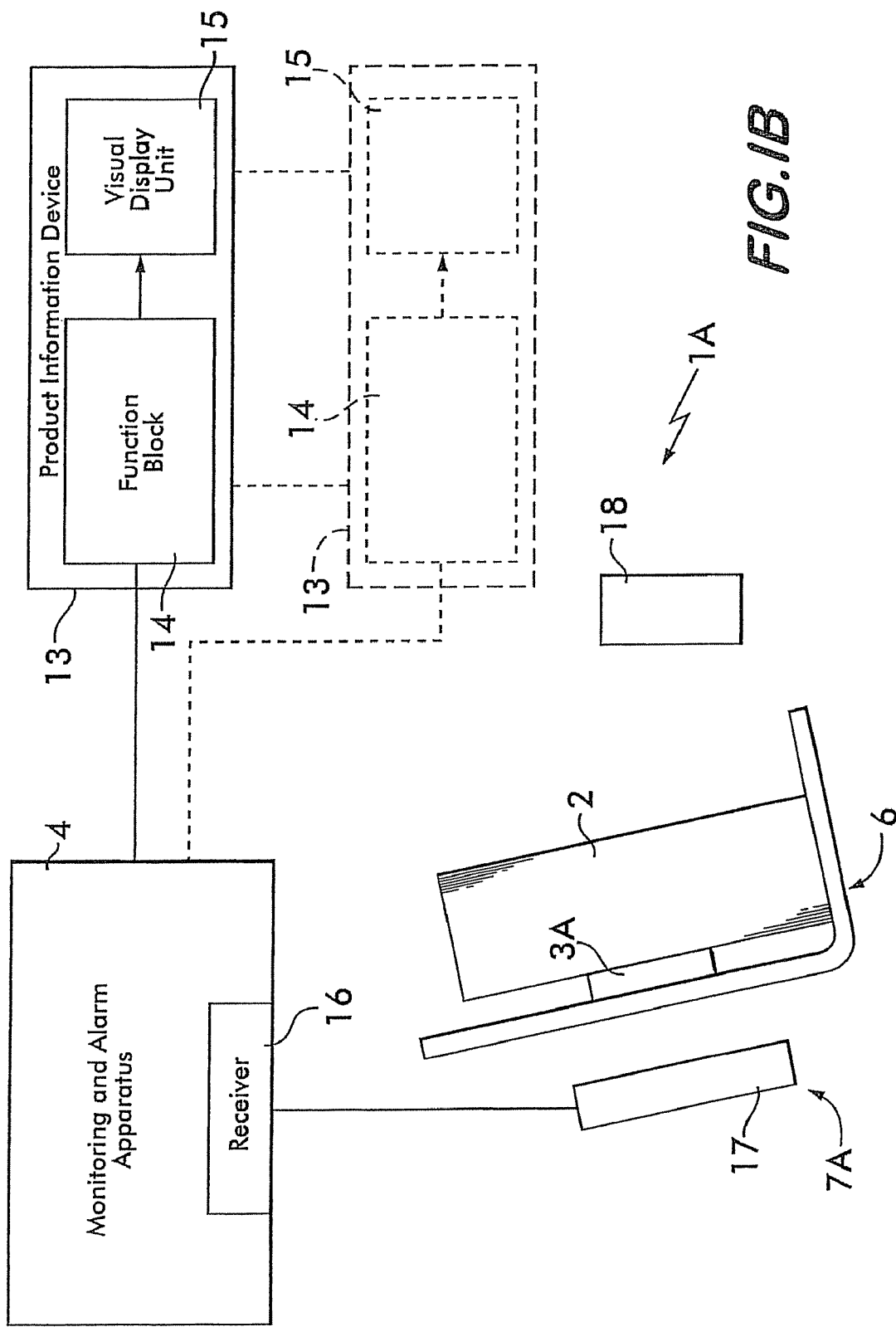
FIG. 1B is an alternative exemplary system for protection against theft whereby a non-contact sensor is used for detecting the manipulation and movement of a product being protected using the present invention.

FIG. 1B shows, in an alternative apparatus, an apparatus 1A, wherein a non-contact sensor, e.g., a proximity sensor 7A, is used rather than the tether or cable 5. Such a proximity sensor is placed in the neighborhood of an object 2 to be protected and the separating distance between this proximity sensor 7A and the object 2, or between the proximity sensor 7A and an approaching person (not shown) is determined and stored. The measurement of the separating distance can be utilized for, among other things, the emission of a signal. This signal may activate an advertising experience (visual and/or audible and/or tactile) regarding information corresponding to the object 2 being approached and/or manipulated and/or a forewarning of a theft of the object 2. If the object 2 is removed, and is positioned, for example, within a removal distance of two meters, it is possible that a registration of the displacement can be given. Such a registration can be, for example, the activation of an LED lamp (not shown, but in the vicinity of the display shelf where the object 2 was originally placed), which informs the person making the removal that his/her actions have been detected. If, for example, he/she removes the object 2 to a distance exceeding two meters, i.e., from the proximity sensor 7A, then this would be evaluated as a theft and an alarm would be emitted to the business personnel. Upon the approach of a person to the object 2, the possibility exists that simultaneously with the forewarning of a possible theft, the information pertaining to the state of the object 2 could be emitted. The proximity sensor 7A can also be so designed, so that it would react to any touching or disturbance of the protected object 2. The emission of a signal can, in this way, be released by an approach to, removal of, or disturbance of the protected object 2.

In particular, the proximity sensor 7A comprises an antenna 17 or the like, which serves as a detection element. The antenna 17 can be integrated with a monitoring and alarm apparatus 4 via a receiver 16. The antenna 17 is placed behind the object 2 to be protected and/or even behind the presentation display shelve 6.

The proximity sensor 7A serves for the capture of the separating distance from the antenna 17 of the proximity sensor 7A between a person (not shown) and/or the object 2 to be protected itself and/or another sensor 3A placed on the object 2. In this way, it is possible that in connection with the proximity sensor 7A the monitoring and the alarm apparatus 4 can be adjusted for signaling upon an approach, for disturbance of the object, or for the removal of the object 2 within a predetermined distance of removal. The adjustment can also include arrangements for theft, designated by the removal of the object 2 by exceeding the predetermined removal distance.

In an exemplary embodiment, a sensor 3A is attached to the object 2 to be protected. The sensor 3A comprises at least a digital/analog input, e.g., a microswitch or a security film for theft prevention as well as for surveillance of batteries in a supply battery assembly.

The proximity sensor 7A reacts also to the approach of a person to the antenna 17, wherein the active distance, for example, can be two meters. Thus, registration can be made which indicates whether the person approaching the antenna 17, the antenna 17 being located near the protected object 2, is nearing the object 2 and also detects from what direction the approach is being made.

Further, this proximity sensor 7A registers by means of the antenna 17, the existing separating distance between the object 2, which has its own sensor 3A, and the antenna 17. Thereby, it is possible to detect whether or not the protected object 2 has been removed from the display case 6 and to what distance it has been displaced from its original displayed position. As mentioned previously, for example, a registration signal can be emitted, in order to inform the user that the action, possibly his own, has been detected and registered.

Especially, by the responsive action of the proximity sensor, i.e. the separating-distance sensor 7A, it is possible that an object-specific advertisement and information for a viewer can be initiated. In a case of a more remote distancing of the protected object 2 from the object storage position (this being on the display case or shelf 6) a theft alarm can be sounded or displayed to the appropriate business personnel.

Under certain circumstances, it is possible that additional tracking measures could be undertaken, e.g., a pursuit of the removed object 2 could be carried out within the confines of the business with corresponding signaling. In such tracking actions, the sensor 3A has a function which may be compared with that of an integrated circuit which is implanted on such an object 2, e.g., a transponder chip (RFID, Radio Frequency Identification).

In addition, the distance sensor 7A can register, by the use of the antenna 17, whether an approaching person is permitted or not, to be present in certain places or on certain equipment. Permitted persons carry an electronic key 18 with them, which sends corresponding characteristic data to the antenna 17 and therewith to the receiver 16. The receiver 16 can transmit these data to a supervisory database or to business personnel via the monitoring and alarm apparatus 4. Thus, there is provided a wireless testing of legitimacy with specially effective capacity for transmission.

The possibility also exists, that the distance sensor 7A possesses a plurality of antennae 17 at one station of supervision. These antennae would be so ordered, that, in at least one instance, even the removal apparatus for the taking of the protected object 2 could be detected. It is also possible that several antennae, could be placed in apportioned distances apart, for instance at intervals of five meters, within a market or within such a spatial enclosure, in order that a spatial pursuit of the protected object, especially for tracking purposes, could be carried out.

To the monitoring and alarm apparatus 4, a plurality of distance sensors 7A can be associated, whereby an antenna for each monitoring station can be sent to one receiver 16.

It should also be mentioned, that for the approach/disturbance sensor even the conductivity of the skin and an electrostatic field can be made use of. In this operation, a transmission of data by means of the skin and otherwise a recognition of the change of an electrical field by a person is possible. To implement such an arrangement, for example, a transmitter integrated into an electronic key 18 (FIG. 1B) can produce an electrostatic field and radiate its signal onto the skin of a person, whereby this can even function without direct skin contact. By means of modulation of data on the signal voltage, which spreads itself over the entire skin surface, information or data can be transmitted, for instance, which provides identification. From a practical standpoint, this can be constructed with the following background:

In the case of an active data transmission, by means of the skin, small, bodily-carried transmitters produce an electrical field by means of which, the coded data can be sent directly or capacity-wise to one or more receivers. The transmitted information can, in this way, identify an object or a person.

The reception of such signals is, however, only possible if the sender is equipped with apparatuses which are close to the body. As a result, it is possible that immediately circuitry processes are released. This process, or processes, can however, be reversed. If these apparatuses are removed, and thereby the transmission is broken off, then, appropriately, an immediate switch action occurs. Even the alteration of an electrical field by means of an approaching person, or the entry of a person into an electrostatic field can be detected in this manner. In this way, the approach of a person can be passively recognized, which can give rise to appropriate action. For instance, this can be used for the transmission of the object information.

Excluding the active transmission of object information (advertising), passive detection of the approach of a person can be done without identification of the receiver.

If on the object 2, which is to be protected, for instance, a sensor 3A is installed with a transmitter, then upon theft of the object 2, the location of the stolen object 2 can be detected. This is possible, because the transmitter is the installed on the (now, stolen) object 2 and communicates to the skin surface of the person and thereby builds an electrostatic field. This field, by means of a receiver, which may be one of many in distributed in different locations in the, for instance, business can be received, so that a search of the stolen object 2 is possible. In this way, by means of equipping the proximity sensor 7A and/or the sensor 3, which latter is installed on the object 2 to be protected, with a transmitter, an electrostatic field can be produced, which field can be employed in various manners. The electrostatic field can, as already has been described, be communicated to the skin of a person and used, for example, for the transmission of data. Otherwise, it is also possible that an evaluation of the change of an electrostatic field, which change has been instigated by a person, can be used for the release of an appropriate action.

The sensor 7A can serve as a special proximity sensor wherein it will be installed as an instrument sensitive to a separating distance. Such a proximity sensor would be placed in the neighborhood of an object to be protected and the separating distance between the proximity sensor and the object, or between the sensor and an approaching person is determined and registered.

The measurement of separating distance can be utilized for, among other things, the emission of a signal. The eventual use could include the activation of reporting a product specific item of information and/or a forewarning of a theft. If the product is removed, and lies, for instance, within a removal distance of two meters, it is possible that a registration of the displacement can be given. Such a registration could be, for example, the activation of an orange LED lamp, which would inform the person making the said removal that his action has been registered. If, for example, he removes the object to a distance exceeding two meters, i.e. from the proximity sensor, then this would be evaluated as theft and an alarm released.

Upon the approach of a person to the said object, the possibility exists, that simultaneously with the forewarning, the said information regarding the state of the product could be emitted. The proximity sensor can also be so designed, that, it would react to any touching or disturbance of the said protected object. The emission of an action can, in this way, be released by an approach to, removal of, or disturbance of the protected object.

It should be understood that it is within the broadest scope of the present invention to include the use of the non-contact sensor 7A of FIG. 1B into the system depicted in FIG. 1. Thus, the non-contact sensor 7A (FIG. 1B) can be substituted for the tethered configuration of FIG. 1.

FIGS. 3-6 depict another feature of the system and method of the present invention: charging or powering the electronic devices on display. Thus, not only is theft protection and advertisement provided by the system and method of the present invention but so is the powering of these devices. By way of example only, eight cellular phones that are displayed can be powered through a switch box 20 which is connected to a single power supply. Under the control of a multiplexer 22 connected to the CMS, the switch box 20 alternates the charging of the 8 phones every predetermined number of minutes (this time interval can be modified as desired) so that a smaller power supply can be used (2 pole). The eight cell phones may be connected to the switch box 20 via eight, 6-pole conductors wherein the switch box 20 is controlled via eight, 4-pole conductors. Alternatively, constant charging of all products could be possible as well with a stronger power supply. Each displayed cell phone is connected to one sensor (e.g., via adhesive pad) which secures and charges the product.

Figure 4:
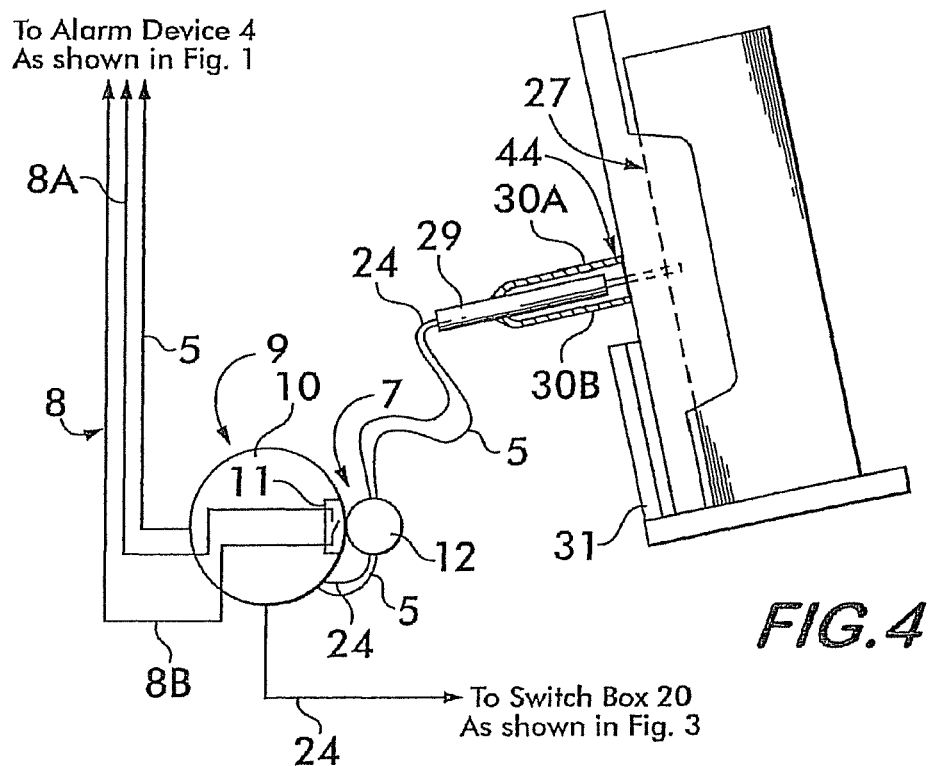
FIG. 4 is a functional view of the powering/charging feature of the present invention whereby power/charge is provided to an electronic item along with theft detection and product advertisement.

Another embodiment of the present invention is shown in FIGS. 3-6 which still utilizes the CMS (including product information devices 13), transmitter 4A and other wireless receivers 4B, as shown in FIG. 1. However, in this embodiment, the ability to power the electronic device on display, as well as the theft alert detection are provided via the tether. In particular, as shown in FIG. 4, the theft detection sensor comprises proximity sensor or reed switch 42A (as will be discussed in detail later) with cable 5 providing the sensor signal path. An electronic device cradle 27 holds the electronic device 2. An aperture (not shown) in the cradle 27 permits the insertion of a power jack 29 into the electronic device 2 to keep it powered. A pair of fingers or coupling members 30A and 30B (e.g., molded to the back of the cradle 27) secure the power jack 29 as will be discussed in detail later. It should be noted that the back surface 31 of the shelf display 6 is shortened to permit the use of the cradle 27.

FIG. 5 is a cross-sectional view of the power jack 29 in the unconnected state. The jack 29 comprises an outer housing 32 having a pair of apertures 34A and 34B on opposing sides of the housing 32. Concentrically and slidably mobile within the housing 32 is an electrode element 36 for supporting power electrode 38 which receives power through power conductor 24. The base of the electrode element 36 is coupled to the base of the housing 32 using a spring 40. A proximity sensor, or reed switch 42A (attached to the inside base surface of the housing 32) having an associated sensor conductor 5 includes a corresponding element 42B (e.g., magnet) attached to the base surface of the electrode element 36. In order to connect the power jack 29 to the electronic device 2, store personnel need to pull the electrode element 36 out of the housing 32 and to allow the fingers 30A and 30B to pass through the respective apertures 34A/34B as shown in FIG. 6. This can be accomplished by the person pressing the fingers 30A/30B at the neck 44 (see FIG. 4) to spread the ends of the fingers 30A/30B and to allow the fingers 30A/30B to pass through the apertures 34A/34B and to capture the bottom surface of the electrode element 36 against the bias of the stretched spring 40. The electrode 38 can be inserted through the aperture (not shown) in the cradle 27 and into the power receptacle (not shown) of the electronic device 2. In this position, the proximity sensor or reed switch 42A is displaced away from the corresponding element 42B. In this position, the signal conductor 5 conveys a "non-theft" condition to the alarm device 4. As a result, the electronic device 2 is being powered while an "non-theft" condition signal is provided to the alarm device 4 and if a customer grasps the electronic device 2 and manipulates it, the removal sensor 7 is activated to initiate the product advertisement. Should a thief attempt to disconnect the electronic device 2 by jerking the device 2 away from the power jack 29, or being savvy enough to squeeze the fingers 30A/30B together to release the power jack 29, the electrode element 36 snaps towards the base surface of the housing 32 due to the spring 40 bias, and the proximity sensor 42A detects the corresponding element 42B and reports the theft condition. Thus, by use of the configuration shown in FIGS. 3-6, powering/charging, anti-theft and product advertisement initiation are accomplished.

It should be understood that it is within the broadest scope of the present invention to include the powering or charging feature of an electronic item along with the automated product advertisement-initiated-upon-manipulation of/approach to the electronic item, independent of the automatic transmission of the wireless signal 100 from the transmitter 4A to the remote receiver 4B (FIG. 1).

Thus, some of the advantages of the system and method of the present invention are:

reduces staffs work load (explaining products), helps them focus on real service;
end customers do not have to wait to get product information in case staff is busy;
quick and detailed product information at a glance;
helps customer make a qualified decision about which product suits his needs best;
extended offers (accessories) for individual products;
retailer can rent out advertisement space to manufacturer (during special promotions or "stand-by mode");
no need anymore for "hard-copy" price labeling, product information display; therefore more products can be displayed (unless hard-copy labeling is required by law); and
possibility of customer-oriented display of secured products together with product promotion.

Furthermore, it is within the broadest scope of the present invention to include the creation of statistics (e.g., via Check-Pro Manager®) using the CMS as to which product was picked up the most, hit list, etc). This also includes the creation of hit lists regarding product interest of customers/sales data/etc. in connection with merchandise planning and control systems and CheckPro Manager® data. The statistics ad hit lists can be provided via Ethernet.

Because the electronics industry is constantly developing new high technology products and due to the complexity of the offered products, it is becoming more and more difficult for an end customer to distinguish between displayed items which one would serve his/her needs best. However, by playing customized advertisements as soon as the product gets picked up by the customer, this distinction becomes much easier.

It is within the broadest scope of the present invention to include the securement of non-electronic devices while promoting them at the same time (e.g., bottles, razors, etc.).

While the invention has been described in detail and with reference to specific examples thereof, it will be apparent to one skilled in the art that various changes and modifications can be made therein without departing from the spirit and scope thereof.

What is claimed is:

1. A method comprising:
   displaying a plurality of merchandise items at a merchandise display allowing a customer to handle the merchandise items;
   providing audio video information at the merchandise display, wherein the audio video information is based on one or more of the plurality of merchandise items;
   detecting a possible theft when one of the merchandise items is removed from the merchandise display;
   generating an alarm when the possible theft is detected;
   accepting a customer purchase request from a purchasing customer, wherein the purchase request is accepted at the merchandise display to purchase a product related to the plurality of merchandise items;
   forwarding the customer purchase request over a network to a remote location remote from the merchandise display; and
   processing the customer purchase request at the remote location to allow the purchasing customer to pick up the product at a remote location.

2. The method of claim 1 further comprising:
   forwarding the customer purchase request over a network within a store where the merchandise display is located; and
   processing the customer purchase request at the store to allow the purchasing customer to pick up the product at the store or at the remote location.

3. The method of claim 1 further comprising:
   processing the customer purchase request at the remote location; and
   mailing the product to the purchasing customer.

4. A method comprising:
   displaying a plurality of merchandise items at a merchandise display allowing a customer to handle the merchandise items;
   providing audio video information at the merchandise display, wherein the audio video information is based on one or more of the plurality of merchandise items;
   detecting a possible theft when one of the merchandise items is removed from the merchandise display;

generating an alarm when the possible theft is detected; and accepting a customer purchase request from a purchasing customer, wherein the purchase request is accepted at the merchandise display to purchase a product related to the plurality of merchandise items, wherein the plurality of merchandise items are wireless devices and the customer purchase request is a monthly service request related to the wireless devices.

5. The method of claim 4 wherein the wireless devices are cellular phones and the customer purchase request is a cellular phone service request.

6. The method of claim 4 further comprising:
cryptographically manipulating data associated with the customer purchase request to produce encrypted data; and
transmitting the encrypted data over a network to a remote location.

7. The method of claim 4 wherein the accepting the customer purchase request further comprises:
accepting information from at least one of the group of: a customer address, customer payment information, a product being purchased, a quantity of the product being purchased and a delivery method of the product being purchased.

8. The method of claim 4 further comprising:
providing a graphical user interface (GUI) to the purchasing customer, wherein the accepting the customer purchase request is accepted through the GUI.

9. A merchandise display comprising:
a display area for displaying a plurality of merchandise items, and wherein the display area is configured to permit customer handling of the merchandise items;
detection logic configured to detect the removal of one of the merchandise items from the merchandise display;
alarm logic configured to generate an alarm responsive to the detection logic detecting the removal of one of the merchandise items from the merchandise display;
an audio visual display device configured to play audio visual data at the merchandise display;
purchase logic configured to prompt a purchaser for purchase data associated with one or more of the plurality of merchandise items, and wherein the purchase logic is configured to receive the purchase data;
network logic configured to transmit the purchase data over a network to a remote device at a location remote from the merchandise display; and
wherein the purchase data contains information to allow the remote device to process the purchase data at the remote location to create a processed request and to send a result of the processed request to the remote location.

10. The merchandise display of claim 9 further comprising:
network logic configured to transmit the purchase data over a network within a store where the merchandise display is located, wherein the purchase data is received by a remote device that processes the purchase data at the store instead of at the remote location allowing the purchaser to pick up the product at the store.

11. The merchandise display of claim 9 wherein the purchase logic includes a touch screen display device configured to allow the purchaser to input the purchase data.

12. A merchandise display comprising:
a display area for displaying a plurality of merchandise items, and wherein the display area is configured to permit customer handling of the merchandise items;
detection logic configured to detect the removal of one of the merchandise items from the merchandise display;
alarm logic configured to generate an alarm responsive to the detection logic detecting the removal of one of the merchandise items from the merchandise display;
an audio visual display device configured to play audio visual data at the merchandise display; and
purchase logic configured to prompt a purchaser for purchase data associated with one or more of the plurality of merchandise items, and wherein the purchase logic is configured to receive the purchase data, wherein the plurality of merchandise items are wireless devices and the purchase data is part of a purchase request for a monthly service request associated with the wireless devices.

13. The merchandise display of claim 12 wherein the wireless devices are cellular phones and the purchase request is a cellular phone service request.

14. The merchandise display of claim 12 further comprising:
cryptographic logic to encrypt the purchase data to produce encrypted data, and wherein the merchandise display is configured to transmit the encrypted data through a network to a remote device.

15. The merchandise display of claim 12 the purchasing logic is further configured to provide a graphical user interface (GUI) to the purchaser, wherein the purchasing logic is further configured to receive the purchase data from the GUI.

16. The merchandise display of claim 15 wherein the GUI is configured to prompt the purchaser for different fields of data associated with a type of purchase the purchaser is requesting.

17. A method comprising:
displaying a plurality of merchandise items at a merchandise display allowing a customer to handle the merchandise items;
providing audio video information at the merchandise display, wherein the audio video information is based on one or more of the plurality of merchandise items;
detecting a possible theft at the merchandise display when one of the merchandise items is removed from the merchandise display;
generating an alarm at the merchandise display when the possible theft is detected; and
accepting a customer purchase request from a purchasing customer, wherein the purchase request is accepted at the merchandise display to purchase a product related to the plurality of merchandise items.

* * * * *